(12) United States Patent
Ain et al.

(10) Patent No.: US 7,313,638 B2
(45) Date of Patent: Dec. 25, 2007

(54) COMMAND ACCUMULATION TOOL

(75) Inventors: Jonathan Wade Ain, Tucson, AZ (US); Louie Arthur Dickens, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 10/869,338

(22) Filed: Jun. 16, 2004

(65) Prior Publication Data
US 2005/0283541 A1    Dec. 22, 2005

(51) Int. Cl.
G06F 3/00    (2006.01)

(52) U.S. Cl. ............................................. 710/53; 710/5

(58) Field of Classification Search .................. 710/53, 710/57, 5; 712/200
See application file for complete search history.

(56) References Cited

U.S. PATENT DOCUMENTS

| | | | |
|---|---|---|---|
| 5,564,023 A | 10/1996 | Young | 395/280 |
| 5,625,800 A | 4/1997 | Brayton et al. | 395/500 |
| 5,781,803 A | 7/1998 | Krakirian | 395/894 |
| 6,047,389 A * | 4/2000 | Thai | 714/38 |
| 6,223,244 B1 * | 4/2001 | Downer et al. | 710/244 |
| 6,341,315 B1 | 1/2002 | Arroyo et al. | 709/230 |
| 6,609,161 B1 * | 8/2003 | Young | 710/5 |
| 2002/0023203 A1 * | 2/2002 | Cofler et al. | 712/227 |
| 2005/0034039 A1 * | 2/2005 | Prasadh et al. | 714/727 |

* cited by examiner

Primary Examiner—Donald Sparks
Assistant Examiner—Harold Kim
(74) Attorney, Agent, or Firm—John H. Holcombe

(57) ABSTRACT

A command accumulation tool, a testing tool for a queue, and a method, are provided, which, for example, may cause commands to accumulate in queue(s). In one embodiment, a testing tool comprises an I/O interface for connecting with a target having the queue(s); and an I/O interface for connecting with initiator(s). Trigger logic intercepts a predetermined response at the target I/O interface from a target to an initiator with respect to a command of the initiator, and asserts a trigger signal. Outbound logic responds to the trigger signal, providing a reject and retry response at the target I/O interface for the target with respect to the response from the target, whereby a timeout timer for the command of the initiator is stopped for the queue(s). The outbound logic additionally conducts flow control with respect to the target at the target I/O interface.

5 Claims, 2 Drawing Sheets

COMMAND ACCUMULATION TOOL

FIELD OF THE INVENTION

This invention relates to the communication of commands and responses, and, more particularly, to providing commands from an initiator to at least one target.

BACKGROUND OF THE INVENTION

For many information handling systems, it is desirable to be able to execute more than one command at a time. One example is data storage devices which have a longitudinal media, such as magnetic tape drives, or a cyclic media, such as optical disk or magnetic disk drives. Executing more than one command at a time allows the data storage device to optimize commands based on the position of the data on the data storage media, caching status, and the proximity of sequential data for multiple operations.

In the example of Serial Attached SCSI (SAS) architecture, command sequence numbers may be used, whereby an unique, one-byte value is issued with each command, and is presented by either the initiator or target with each command, data or status transfer as part of the nexus that is established to accomplish a particular transaction. The SAS architecture allows up to 64K outstanding commands to be issued before the command queue is full, and no more commands can be issued until an issued command completes.

Because typical devices under test, such as data storage devices, can execute commands relatively rapidly, it is difficult to fill the queue of a SAS device as it is tested to verify that the queuing algorithms are functioning properly.

An approach for an alternative environment, such as parallel SCSI, is described by copending, coassigned U.S. patent application Ser. No. 10/812,326, which comprises a reconnection inhibitor which inhibits an Input/Output (I/O) controller from accessing a bus. An initiator transmits I/O requests on the bus to the controller, wherein the I/O requests are queued in an I/O queue, wherein the I/O controller is inhibited by the reconnection inhibitor from gaining access to the bus to drain the queue.

SUMMARY OF THE INVENTION

The present invention comprises a command accumulation tool, a testing tool for a queue, and a method, which, for example, may cause commands to accumulate in at least one queue.

In various embodiments, a predetermined response from the target to the initiator with respect to a command of the initiator is intercepted; in response to the interception of the predetermined response, a reject and retry response is provided for the target with respect to the response from the target; and flow control is conducted with respect to the target. In one embodiment, the present invention thus prevents the target from reconnecting to the initiator, and keeps the command pending in the queue(s) to accumulate with other commands.

In one embodiment, a command accumulation tool comprises trigger logic which intercepts a predetermined response from a target to an initiator with respect to a command of the initiator, and asserts a trigger signal; and outbound logic responds to the trigger signal, providing a reject and retry response for the target with respect to the response from the target; and subsequently conducts flow control with respect to the target.

In a further embodiment, the outbound logic supplies the reject and retry response additionally in the event of receipt of an idle term from the initiator.

In a still further embodiment, the outbound logic conducts flow control comprising providing a receiver ready signal for the target.

In a still further embodiment, the outbound logic conducts flow control comprising providing the receiver ready signal in the event of an idle term from the initiator that is received subsequent to the idle term that resulted in the outbound logic providing the reject and retry response.

In another embodiment, wherein the trigger logic additionally, upon intercepting the predetermined response, provides an idle term for the initiator that is ostensibly from the target.

In another embodiment, a testing tool for at least one queue, comprises an I/O interface for connecting with a target having the queue(s); and an I/O interface for connecting with at least one initiator. Trigger logic of the testing tool intercepts a predetermined response at the target I/O interface from a target to an initiator with respect to a command of the initiator, and asserts a trigger signal. Outbound logic of the testing tool responds to the trigger signal, providing a reject and retry response at the target I/O interface for the target with respect to the response from the target, whereby a timeout timer for the command of the initiator is stopped for the queue(s). The outbound logic additionally conducts flow control with respect to the target at the target I/O interface.

In a further embodiment, wherein the outbound logic additionally receives communications from the initiator for the target at the initiator I/O interface, the outbound logic supplies the reject and retry response additionally in the event of receipt of an idle term from the initiator at the initiator I/O interface.

In a still further embodiment, wherein the outbound logic conducts flow control comprising providing a receiver ready signal at the initiator I/O interface for the initiator.

In a still further embodiment, wherein the outbound logic conducts flow control comprising providing the receiver ready signal in the event of receipt of an idle term from the initiator received at the initiator I/O interface subsequent to the idle term that resulted in the outbound logic providing the reject and retry response.

In another embodiment, the outbound logic additionally, subsequent to the outbound logic providing the receiver ready signal, switches to a pass-thru mode, allowing words received at the initiator I/O interface for the target to be provided at the target I/O interface for the target.

In still another embodiment, wherein the trigger logic additionally, upon intercepting the predetermined response, provides an idle term at the initiator I/O interface for the initiator, the idle term ostensibly from the target.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
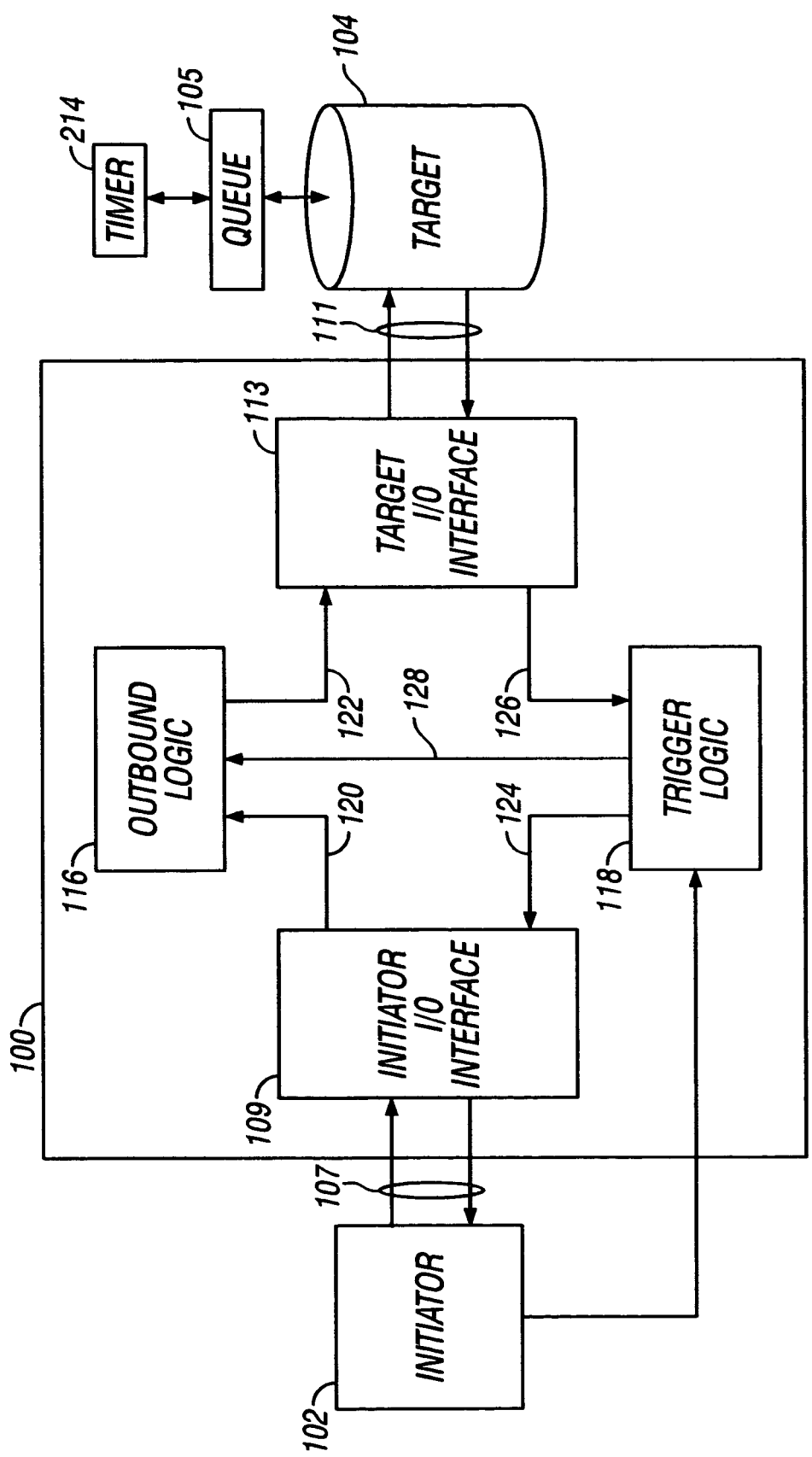
FIG. 1 is a block diagram of a command accumulation tool in accordance with an embodiment of the present invention and arranged for testing a queue of a target.

FIG. 1 illustrates an embodiment of a command accumulation tool 100 interconnected between an initiator 102 and at least one target 104 that, for example, is to be tested. One or more target devices may be tested at one time. The command accumulation tool is arranged for testing at least one queue 105 of the target 104. As discussed above, because typical devices, such as data storage devices, can execute commands relatively rapidly, it is difficult to fill the queue 105 of a SAS device as it is tested to verify that the queuing algorithms are functioning properly.

The command accumulation tool 100 is interconnected between the initiator 102 and the target device(s) 104 to logically appear to the initiator as the target device(s) and to logically appear to the target device(s) as the initiator. In the example of Serial Attached SCSI (SAS) architecture, the physical connection between an initiator and a target is a serial duplex connection, such as a duplex cable or network interconnect. In the illustrated example, an initiator duplex connection 107 is provided between the initiator 102 and an initiator input/output (I/O) interface 109 of the command accumulation tool 100, and a target duplex connection 111 is provided between the target 104 and a target input/output (I/O) interface 113 of the command accumulation tool 100. The command accumulation tool 100 is thus arranged such that all the traffic between the target 104 and the initiator 102 pass through the command accumulation tool.

In the embodiment of FIG. 1, and in the context of SAS architecture, the communications on the duplex connections 107 and 111 comprise serially encoded communications. The initiator I/O interface 109 and target I/O interface 113 of the command accumulation tool 100 deserialize the incoming communications into parallel unencoded words, and serialize the outgoing communications into serially encoded communications. The I/O interfaces comprise SCSI/SAS interface chipsets, as are known to those of skill in the art, for example, and are available from suppliers such as Qlogic or Adaptec.

Outbound logic 116 provides the data flow from the initiator I/O interface 109 to the target I/O interface 113. The encoded communications from the initiator are deserialized and comprise parallel unencoded words provided by the initiator I/O interface 109 to the outbound logic 116 over path 120. The data is either passed through unchanged, or is changed as will be explained. The deserialized unencoded communications from the outbound logic 116 are provided to the target I/O interface 113 over path 122 and are encoded and serialized and transferred to the target 104.

Similarly, encoded, serialized data moves from the target 104 to the target I/O interface 113, where it is converted to parallel unencoded words and provided via path 126 to trigger logic 118. The trigger logic analyzes the words and makes control decisions based upon the content of the words and the state of a control 130, which may be from the initiator 102. Trigger logic 118 also has the ability to pass through data unchanged or to convert the data. The deserialized unencoded communications from the trigger logic 118 are provided to the initiator I/O interface 109 over path 124 and are encoded and serialized and transferred to the initiator 102.

Outbound logic 116 and trigger logic 118 may comprise the same or separate hardware operated by firmware, such as a field programmable gate array (FPGA), or may comprise predetermined logic in a programmable read only memory (PROM), or other logic arrangements as are known to those of skill in the art. FPGA logic is available from such suppliers as Xilinx or Altera.

Figure 2:
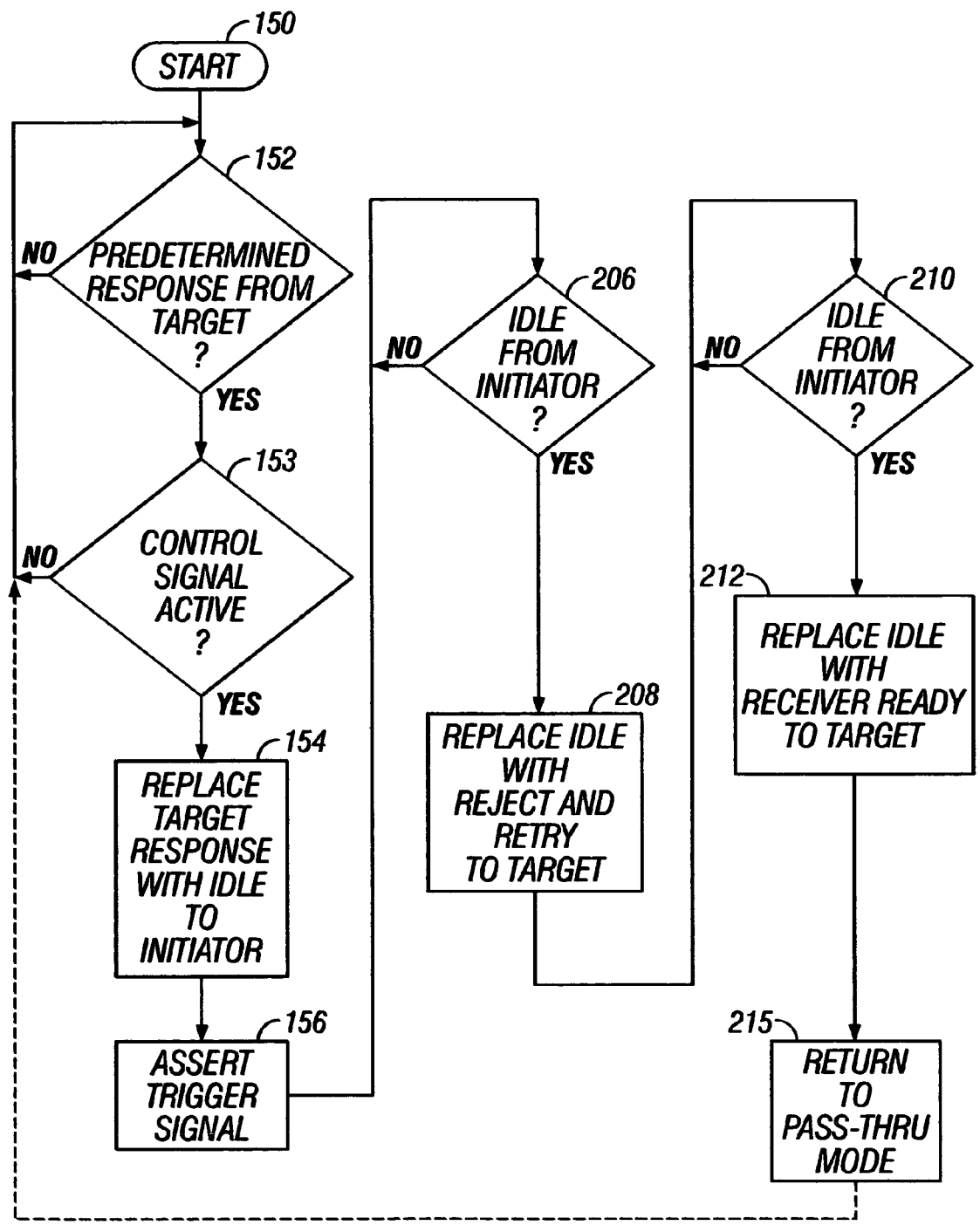
FIG. 2 is a flow chart depicting an embodiment of the present invention for providing command accumulation at a target in accordance with the embodiment of FIG. 1.

Referring to FIGS. 1 and 2, operation of the trigger logic 118 and outbound logic 116 may be enabled by a signal on a control line 130, for example, from the initiator 102. Alternatively, the control line 130 may be separately enabled. When not enabled, the trigger logic 118 and outbound logic 116 pass through the communications without change.

An embodiment of the present invention begins at step 150, and, in step 152, the trigger logic 118 looks for a predetermined response from the target 104 to the initiator with respect to a command of the initiator. The predetermined response will appear on path 126 from the target I/O interface 113. In the example of SAS architecture, the predetermined response comprises an "OPEN" frame, in which the target is attempting to open communication with the initiator. An OPEN frame is part of SCSI protocol, and is an unique pattern defined by the architecture to open communication before any work can be conducted between the initiator and target. If no OPEN frame is detected, the trigger logic continues to look for one. If the predetermined response, an OPEN frame, is detected, the trigger logic 118 checks to determine, in step 153, whether the control signal is active. If the control signal 130 is not active, then the trigger logic 118 returns to step 152 to look for another OPEN frame. Steps 152 and 153 may be reversed, or step 153 may be omitted, such that the command accumulation tool 100 is always on, looking for OPEN frames.

If the predetermined response, an OPEN frame, is detected, and the control signal is active, the trigger logic 118 intercepts the predetermined response from the target in step 154, and additionally, upon intercepting the predetermined response, provides an idle term for the initiator that is ostensibly from the target. An idle term is a standard default under SCSI protocol, that is sent when there is nothing active to send.

In one embodiment, upon detecting the predetermined response, the trigger logic 118 asserts trigger signal 128 for the outbound logic 116. If trigger logic 118 and outbound logic 116 comprise the same logic entity, the asserted trigger signal of step 156 comprises the logic proceeding to step 206. Step 206 and the subsequent steps are conducted by the outbound logic 116.

In step 206, the outbound logic 116 looks for an idle term from the initiator 102 in the data stream from the initiator on path 120. As is known to those of skill in the art, an idle term is often provided in the absence of command or data signaling. In the event an idle term is detected, the outbound logic, in step 208, replaces the idle term with a reject and retry response for the target and provides the reject and retry response on path 122 for the target 104. Thus, with respect to the response from the target to the initiator, the target 104 is presented with a reject and retry response. The reject and retry response is, in one example, a primitive housekeeping command at a lower level than a SCSI command, as is known to those of skill in the art, and may take the form of an "OPEN_Reject_Retry" primitive, that means that the initiator is not accepting your OPEN frame and please retry again. As the result, the target 104 will wait some time and send an OPEN frame again, thereby accumulating in the queue 105, the original command that the OPEN frame was in response to.

In one embodiment, the reject and retry response provided on path 122 at the target I/O interface 113 for the target with respect to the response from the target, causes a timeout timer 214 for the original command of the initiator to be stopped for the queue 105, thereby accumulating the original command that the OPEN frame was in response to in the queue 105.

The outbound logic 116 then, in step 210, again looks for an idle term from the initiator 102 in the data stream from the initiator on path 120. In the event an idle term is detected, the outbound logic, in step 212, replaces the idle term with a receiver ready signal for the target 104 on path 122, ostensibly as a response to the target's OPEN frame, thereby conducting flow control with respect to the target. The received idle term is thus subsequent to the idle term from the initiator that resulted in the outbound logic providing the reject and retry response. The receiver ready signal is, in one example, also a primitive housekeeping command at a lower level than a SCSI command, as is known to those of skill in the art, and may take the form of an "rRdy" primitive, that means that the initiator is granting the target buffer "credit" to send to the initiator one and only one frame, thereby preventing the overrun of the target, and comprising flow control. As is known to those of skill in the art, a target device, for example, sending an OPEN frame, requires buffer "credit" back, so that the target will be able to send another OPEN frame.

In summary, the present invention thus prevents the target 104 from reconnecting to the initiator 102, and keeps the command pending in the queue(s) to accumulate with other commands.

In step 215, the command accumulation tool 100 returns to pass-thru mode, cycling back to step 152 where the trigger logic 118 once again looks for a predetermined response from the target to an initiator with respect to a command of the initiator.

Referring to FIG. 1, "expanders", as are known to those of skill in the art, may be provided between the initiator 102 and command accumulation tool 100 in duplex connection 107, between the target(s) 104 and command accumulation tool 100 in duplex connection 111, or both.

The illustrated components of the command accumulation tool and testing tool of FIG. 1 may be varied, combined, or combined functions may be separated, as is known to those of skill in the art. The illustrated steps of FIG. 2 may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A command accumulation tool, comprising:
    trigger logic apparatus configured to intercept a predetermined response from a target to an initiator with respect to a command of said initiator, and assert a trigger signal; and
    outbound logic apparatus configured to respond to said trigger signal and provide a reject and retry response for said target with respect to said response from said target; and said outbound logic apparatus configured to subsequently conduct flow control with respect to said initiator; wherein said outbound logic apparatus is configured to receive communications from said initiator for said target, said outbound logic apparatus configured to supply said reject and retry response additionally in the event of receipt of an idle term from said initiator; wherein said outbound logic flow control comprises said outbound logic apparatus providing a receiver ready signal for said target; and wherein said outbound logic flow control comprises said outbound logic apparatus configured to provide said receiver ready signal in the event of receipt of an idle term from said initiator received subsequent to said idle term resulting in said outbound logic apparatus providing said reject and retry response.

2. A testing cool for at least one queue, comprising:
    a target I/O interface configured to connect with a target having said at least one queue;
    an initiator I/O interface configured to connect with at least one initiator;
    trigger logic apparatus configured to intercept a predetermined response at said target I/O interface from said target to said initiator with respect to a command of said initiator, and assert a trigger signal; and
    outbound logic apparatus configured to respond to said trigger signal and provide a reject and retry response at said target I/O interface for said target with respect to said response from said target, whereby a timeout timer for said command of said initiator is stopped for said at least one queue; and said outbound logic apparatus configured to subsequently conduct flow control with respect to said target at said target I/O interface;
    wherein said outbound logic apparatus is configured to receive communications from said initiator for said target at said initiator I/O interface, and said outbound logic apparatus configured to supply said reject and retry response additionally in the event of receipt of an idle term from said initiator at said initiator I/O interface; wherein said outbound logic flow control comprises said outbound logic apparatus providing a receiver ready signal at said target I/O interface for said target; and wherein said outbound logic flow control comprises said outbound logic apparatus providing said receiver ready signal in the event of receipt of an idle term from said initiator received at said initiator I/O interface subsequent to said idle term resulting in said outbound logic apparatus providing said reject and retry response.

3. A testing tool for at least one queue, comprising:
    a target I/O interface configured to connect with a target having said at least one queue;
    an initiator I/O interface configured to connect with at least one initiator;
    trigger logic apparatus configured to intercept a predetermined response at said target I/O interface from said target to said initiator with respect to a command of said initiator, and assert a trigger signal; and
    outbound logic apparatus configured to respond to said trigger signal and provide a reject and retry response at said target I/O interface for said target with respect to said response from said target, whereby a timeout timer for said command of said initiator is stopped for said at least one queue; and said outbound logic apparatus configured to subsequently conduct flow control with respect to said target at said target I/O interface; wherein said outbound logic apparatus is configured to receive communications from said initiator for said target at said initiator I/O interface, and said outbound logic apparatus configured to supply said reject and retry response additionally in the event of receipt of an idle term from said initiator at said initiator I/O interface; wherein said outbound logic flow control comprises said outbound logic apparatus providing a receiver ready signal at said target I/O interface for said target; and wherein said outbound logic apparatus is configured to additionally, subsequent to said outbound logic apparatus providing said receiver ready signal, switch to a pass-thru mode, allowing words received at said initiator I/O interface for said target to be provided at said target I/O interface for said target.

4. A method for accumulating commands of an initiator at a target, comprising the steps of:

intercepting a predetermined response from said target to said initiator with respect to a command of said initiator;

responding to said interception of said predetermined response providing a reject and retry response for said target with respect to said response from said target; and conducting flow control with respect to said target;

wherein said step of providing, said reject and retry response is conducted in the event of receipt of an idle term from said initiator;

wherein said step of conducting flow control comprises providing a receiver ready signal for said target; and wherein said step of providing said receiver ready signal is conducted in the event of receipt of an idle term from said initiator received subsequent to said idle term resulting in said step of providing said reject and retry response.

5. A method for accumulating commands of an initiator at a target, comprising the steps of:

intercepting a predetermined response from said target to said initiator with respect to a command of said initiator;

responding to said interception of said predetermined response, providing a reject and retry response for said target with respect to said response from said target; and conducting flow control with respect to said target;

wherein said step of providing said reject and retry response is conducted in the event of receipt of an idle term from said initiator;

wherein said step of conducting flow control comprises providing a receiver ready signal for said target; and additionally comprising the step of, subsequent to said step of providing said receiver ready signal, switching to a pass-thru mode, allowing words received from said initiator for said target to be provided for said target.

* * * * *